(12) United States Patent
Oda et al.

(10) Patent No.: US 9,559,376 B2
(45) Date of Patent: Jan. 31, 2017

(54) FUEL CELL WITH AN ELECTROLYTE MEMBRANE AND GAS DIFFUSION LAYERS

(75) Inventors: Masaru Oda, Utsunomiya (JP); Teruyuki Ohtani, Haga-gun (JP); Seiji Sugiura, Utsunomiya (JP); Kenichi Tanaka, Utsunomiya (JP); Hiroshi Sohma, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1007 days.

(21) Appl. No.: 13/521,639

(22) PCT Filed: Jan. 12, 2011

(86) PCT No.: PCT/JP2011/050335
§ 371 (c)(1),
(2), (4) Date: Jul. 11, 2012

(87) PCT Pub. No.: WO2011/087013
PCT Pub. Date: Jul. 21, 2011

(65) Prior Publication Data
US 2012/0282539 A1    Nov. 8, 2012

(30) Foreign Application Priority Data
Jan. 14, 2010  (JP) .................... 2010-005520

(51) Int. Cl.
*H01M 8/242*    (2016.01)
*H01M 8/0273*   (2016.01)
(Continued)

(52) U.S. Cl.
CPC .......... *H01M 8/242* (2013.01); *H01M 8/0273* (2013.01); *H01M 8/0276* (2013.01);
(Continued)

(58) Field of Classification Search
CPC ............... H01M 8/242; H01M 8/0273; H01M 8/0271–8/028; H01M 8/0284; H01M 8/0286
See application file for complete search history.

(56) References Cited

U.S. PATENT DOCUMENTS 6,261,711 B1    7/2001  Matlock et al.
7,195,838 B2 *  3/2007  Nanaumi .............. H01M 4/926
                                                      429/480
(Continued)

FOREIGN PATENT DOCUMENTS

CN    101276920       10/2008
EP    1973184 A2      9/2008
(Continued)

OTHER PUBLICATIONS

Supplementary European Search Report for Application No. 11732883.1, 7 pages, dated Dec. 4, 2013.
(Continued)

*Primary Examiner* — Maria J. Laios
*Assistant Examiner* — Robert S Carrico
(74) *Attorney, Agent, or Firm* — Nelson Mullins Riley & Scarborough LLP; Anthony A. Laurentano

(57) ABSTRACT

Disclosed is a fuel cell in which an electrolyte membrane-electrode structure is held between the first separator and a second separator. The electrolyte membrane-electrode structure comprises a solid polymer electrolyte membrane, a cathode-side electrode and an anode-side electrode. An end portion of the solid polymer electrolyte membrane projects outwardly beyond end portions of gas diffusion layers, and the both surfaces of the end portion of the solid polymer electrolyte membrane are held between the first protective film and a second protective film. The thickness of the first protective film is set to be thinner than the thickness of the second protective film.

4 Claims, 7 Drawing Sheets

(51) Int. Cl.
    *H01M 8/0276* (2016.01)
    *H01M 8/24* (2016.01)
    *H01M 8/02* (2016.01)
    *H01M 8/10* (2016.01)

(52) U.S. Cl.
    CPC .. *H01M 8/0286* (2013.01); *H01M 2008/1095* (2013.01); *Y02E 60/50* (2013.01)

(56) References Cited

U.S. PATENT DOCUMENTS

| | | | | |
|---|---|---|---|---|
| 7,320,839 | B2 * | 1/2008 | Tsuji | H01M 8/0247 429/456 |
| 8,486,578 | B2 * | 7/2013 | Ishida | H01M 8/0273 429/480 |
| 2001/0051294 | A1 * | 12/2001 | Inoue et al. | 429/35 |
| 2003/0027032 | A1 | 2/2003 | Sugita et al. | |
| 2006/0275650 | A1 | 12/2006 | Yamada et al. | |
| 2008/0230936 | A1 * | 9/2008 | Takada | H01M 8/0273 264/40.1 |
| 2009/0208805 | A1 * | 8/2009 | Wakabayashi | B29C 66/472 429/429 |
| 2009/0246599 | A1 | 10/2009 | Beutel | |
| 2009/0286121 | A1 | 11/2009 | Morimoto et al. | |
| 2010/0196774 | A1 | 8/2010 | Kawabata et al. | |
| 2010/0248087 | A1 * | 9/2010 | Tsuji et al. | 429/535 |

FOREIGN PATENT DOCUMENTS

| | | | |
|---|---|---|---|
| JP | 05021077 | A * | 1/1993 |
| JP | 2004-265824 | | 9/2004 |
| JP | 2006-318940 | | 11/2006 |
| JP | 2007-12583 | | 1/2007 |
| JP | 2007080523 | A * | 3/2007 |
| JP | 4028352 | | 10/2007 |
| JP | 4316164 | | 5/2009 |
| WO | WO 2009072291 | A1 * | 6/2009 |
| WO | 2009/144871 | A1 | 12/2009 |
| WO | 2011/146094 | A1 | 11/2011 |

OTHER PUBLICATIONS

Chinese Office Action for Application No. 201180005123.9, 9 pages, dated Mar. 11, 2014.
International Search Report for Application No. PCT/JP2011/050335, 6 pages, dated Mar. 8, 2011.

* cited by examiner

US 9,559,376 B2

FUEL CELL WITH AN ELECTROLYTE MEMBRANE AND GAS DIFFUSION LAYERS

RELATED APPLICATIONS

This application is a 35 U.S.C. 371 national stage filing of International Application No. PCT/JP2011/050335, filed Jan. 12, 2011, which claims priority to Japanese Patent Application No. 2010-005520 filed on Jan. 14, 2010 in Japan. The contents of the aforementioned applications are hereby incorporated by reference.

TECHNICAL FIELD

The present invention relates to a fuel cell formed by stacking a membrane electrode assembly and separators. The membrane electrode assembly includes an electrolyte membrane and a pair of gas diffusion layers provided on both sides of the electrolyte membrane.

BACKGROUND ART

Generally, a solid polymer electrolyte fuel cell employs a solid polymer electrolyte membrane. The solid polymer electrolyte membrane is a polymer ion exchange membrane. The solid polymer electrolyte membrane is interposed between an anode and a cathode each including a catalyst layer (electrode catalyst) and a gas diffusion layer (porous carbon) to form a membrane electrode assembly (MEA). The membrane electrode assembly is interposed between separators (bipolar plates). Normally, in use, predetermined numbers of the fuel cells are stacked together to form a fuel cell stack mounted in a vehicle, for example.

In the membrane electrode assembly, a thin solid polymer electrolyte membrane is used. Therefore, the solid polymer electrolyte membrane may be damaged undesirably due to the mechanical stress resulting from, e.g., the difference between pressures of reactant gases supplied to the solid polymer electrolyte membrane.

In this regard, for example, a fuel cell as disclosed in Japanese Laid-Open Patent Publication No. 2006-318940 is known. As shown in FIG. 7, the fuel cell includes a unit cell 1, and first and second separators 2, 3 sandwiching the unit cell 1. The unit cell 1 includes a cathode 5a, an anode 6a, and a solid polymer electrolyte membrane 4 interposed between the cathode 5a and the anode 6a.

A first gas diffusion layer 5b is provided on the cathode 5a, and a second gas diffusion layer 6b is provided on the anode 6a. The surface area of the anode 6a and the surface area of the second gas diffusion layer 6b are smaller than the surface area of the solid polymer electrolyte membrane 4. The surface area of the cathode 5a and the surface area of the first gas diffusion layer 5b are smaller than the surface area of the anode 6a and the surface area of the second gas diffusion layer 6b.

A first seal S1 is interposed between the first separator 2 and the solid polymer electrolyte membrane 4 around the cathode 5a. A second seal S2 is interposed between the first separator 2 and the second separator 3 around the anode 6a.

In the unit cell 1, steps, buffers, gas inlets, and gas outlets are not used as power generation areas. In these portions, no gas diffusion function is required. However, the first gas diffusion layer 5b and the second gas diffusion layer 6b extend to a buffer, and the second gas diffusion layer 6b extends to a step.

Normally, the first and second gas diffusion layers 5b, 6b are porous layers of expensive material such porous carbon clothes and porous carbon papers. Therefore, the unit cell 1 is not economical, and the overall cost of the fuel cell is high.

Further, in an attempt to achieve the desired gas diffusion function, the first and second gas diffusion layers 5b, 6b are relatively thick. In the structure, it is difficult to achieve the sufficient flow field height in the buffers, the gas inlets, and the gas outlets. Thus, the pressure loss is increased, and the gas cannot be distributed smoothly to the flow fields at the electrodes.

SUMMARY OF INVENTION

The present invention has been made to solve the problem of this type, and an object of the present invention is to provide a fuel cell in which electrolyte membranes are protected reliably, and the sufficient height is achieved in reactant gas flow fields.

The present invention relates to a fuel cell formed by stacking a membrane electrode assembly and separators. The membrane electrode assembly includes an electrolyte membrane and a pair of gas diffusion layers provided on both sides of the electrolyte membrane.

In the membrane electrode assembly, an end of the electrolyte membrane protrudes outward beyond ends of the gas diffusion layers, and both surfaces at the end of the electrolyte membrane are sandwiched between a first protection film and a second protection film, and the thickness of the first protection film is smaller than the thickness of the second protection film.

In the present invention, both surfaces at the end of the electrolyte membrane, which protrude outside from the end of the gas diffusion layers and are sandwiched between the first protection film and the second protection film, are protected reliably. Further, since the thickness of the first protection film is smaller than the thickness of the second protection film, the sufficient reactant gas flow field height is achieved in the buffer, the reactant gas inlet, and the reactant gas outlet on the side where the first protection film is provided. Further, the reactant gas can be supplied to the power generation area in the flow field almost at the uniform flow rate, and improvement in the power generation performance is achieved. Thus, the desired power generation performance is maintained, and the overall thickness of the fuel cell is reduced easily.

Further, the gas diffusion layers are only provided in areas used for power generation. Since the expensive gas diffusion layers are not formed in the portions where no gas diffusion function is required, the gas diffusion layers are economical, and efficient.

DESCRIPTION OF EMBODIMENTS

Figure 1:
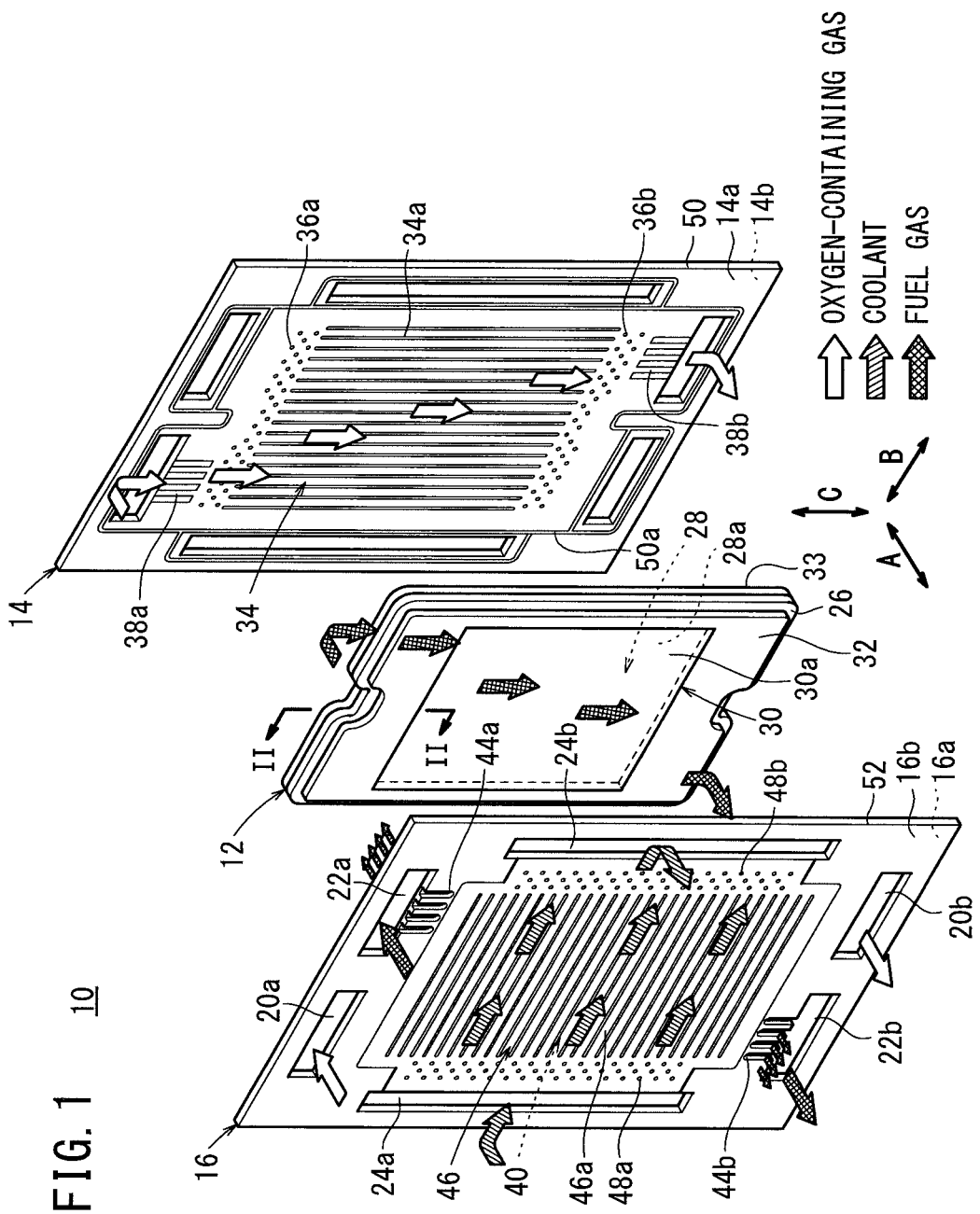
FIG. 1 is an exploded perspective view showing main components of a fuel cell according to a first embodiment of the present invention.

As shown in FIG. 1, a fuel cell 10 according to a first embodiment of the present invention is formed by sandwiching a membrane electrode assembly 12 between a first separator 14 and a second separator 16.

At an upper end of the fuel cell 10 in a longitudinal direction indicated by an arrow C, an oxygen-containing gas supply passage 20a for supplying an oxygen-containing gas and a fuel gas supply passage 22a for supplying a fuel gas such as a hydrogen-containing gas are provided. The oxygen-containing gas supply passage 20a and the fuel gas supply passage 22a extend through the fuel cell 10 in the direction indicated by the arrow A.

At a lower end of the fuel cell 10 in the longitudinal direction indicated by the arrow C, a fuel gas discharge passage 22b for discharging the fuel gas and an oxygen-containing gas discharge passage 20b for discharging the oxygen-containing gas are provided. The fuel gas discharge passage 22b and the oxygen-containing gas discharge passage 20b extend through the fuel cell 10 in the direction indicated by the arrow A.

At one end of the fuel cell 10 in a lateral direction indicated by an arrow B, a coolant supply passage 24a for supplying a coolant, and at the other end of the fuel cell 10 in the lateral direction, a coolant discharge passage 24b for discharging the coolant are provided. The coolant supply passage 24a and the coolant discharge passage 24b extend through the fuel cell 10 in the direction indicated by the arrow A.

Figure 2:
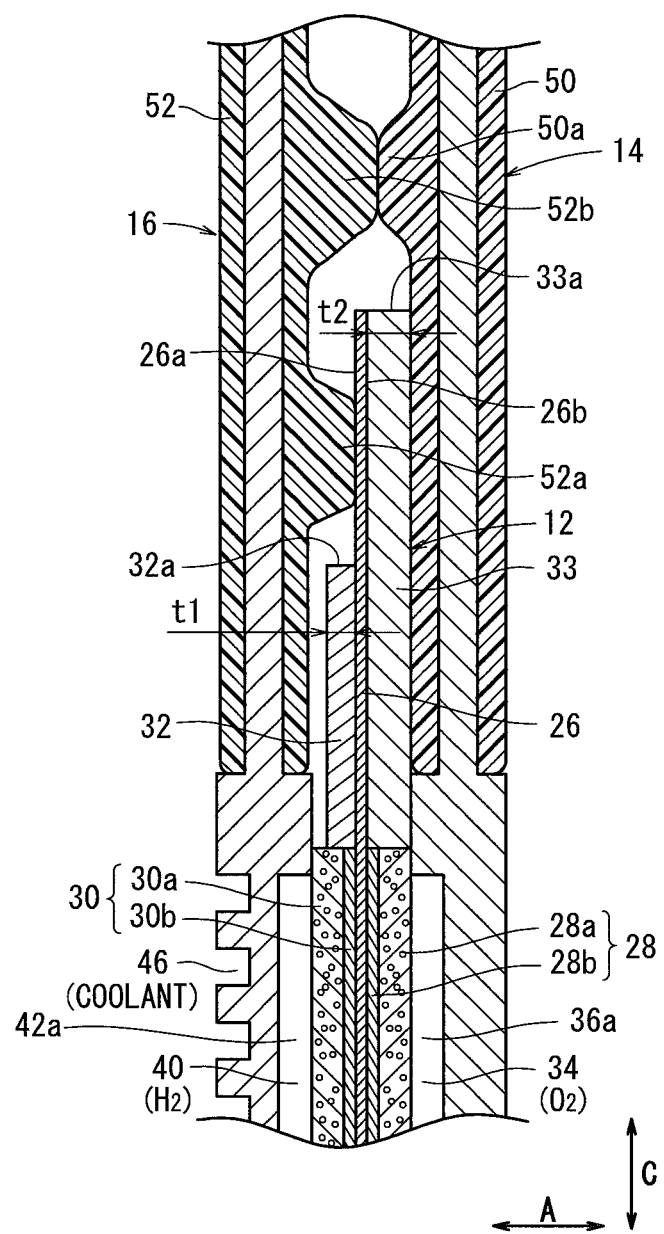
FIG. 2 is a cross sectional view showing the fuel cell, taken along a line II-II in FIG. 1.
Figure 3:
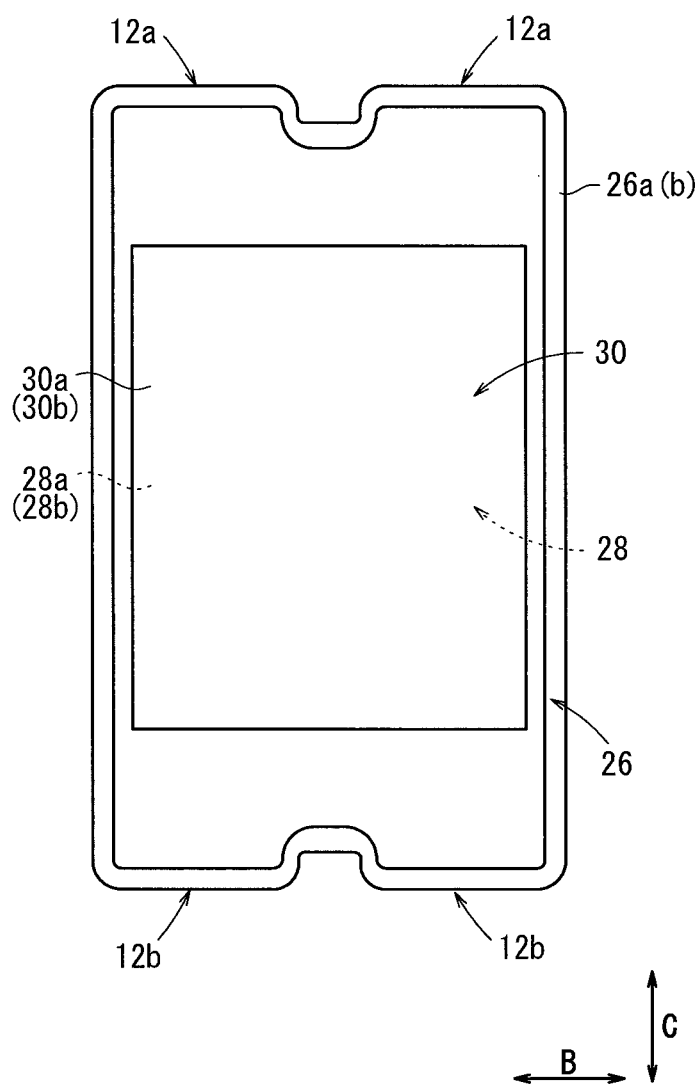
FIG. 3 is a front view showing a membrane electrode assembly of the fuel cell.

As shown in FIGS. 1 to 3, the membrane electrode assembly 12 is elongated in the longitudinal direction. For example, the membrane electrode assembly 12 includes a cathode 28, an anode 30, and a solid polymer electrolyte membrane 26 interposed between the cathode 28 and the anode 30. The solid polymer electrolyte membrane 26 is formed by impregnating a thin membrane of perfluorosulfonic acid with water, for example.

As shown in FIG. 3, a pair of upper extensions 12a protruding toward the oxygen-containing gas supply passage 20a and the fuel gas supply passage 22a are provided on one short side (upper side) of the membrane electrode assembly 12, and a pair of lower extensions 12b protruding toward the oxygen-containing gas discharge passage 20b and the fuel gas discharge passage 22b are provided on the other short side (lower side) of the membrane electrode assembly 12. The number of the upper extensions 12a and the number of the lower extensions 12b may be increased as necessary depending on the number of fluid passages.

As shown in FIG. 2, the cathode 28 has a gas diffusion layer 28a such as a carbon paper, and an electrode catalyst layer 28b of platinum alloy supported on porous carbon particles. The carbon particles are deposited uniformly on the surface of the gas diffusion layer 28a. The anode 30 has a gas diffusion layer 30a such as a carbon paper, and an electrode catalyst layer 30b of platinum alloy supported on carbon porous particles. The carbon particles are deposited uniformly on the surface of the gas diffusion layer 30a.

The electrode catalyst layers 28b, 30b are formed in the same area on both surfaces of the solid polymer electrolyte membrane 26. The gas diffusion layers 28a, 30a are formed in the same area on both surfaces of the solid polymer electrolyte membrane 26, and positions of end surfaces of the gas diffusion layers 28a, 30a are aligned with positions of end surfaces of the electrode catalyst layers 28b, 30b in the stacking direction.

The solid polymer electrolyte membrane 26 includes outer marginal surfaces 26a, 26b protruding outward from ends of the gas diffusion layers 28a, 30a. A first protection film 32 is joined to the outer marginal surface 26a, and a second protection film 33 is joined to the outer marginal surface 26b. Each of the first and second protection films 32, 33 has a frame shape, and is made of engineering plastic or super engineering plastic such as polyphenylene sulfide (PPS) resin, polyetheretherketone (PEEK) based material, or polyether nitrile (PEN).

An outer end surface 32a of the first protection film 32 is provided inside the outer end of the solid polymer electrolyte membrane 26, and outer marginal surface 26a of the solid polymer electrolyte membrane 26 is partially exposed. An outer end surface 33a of the second protection film 33 may be aligned with the outer end surface of the solid polymer electrolyte membrane 26 at the same position. The thickness T1 of the first protection film 32 is smaller than the thickness T2 of the second protection film 33 (T1<T2).

Preferably, the thickness of the second protection film 33 is substantially the same as the thickness of the cathode 28. That is, the second protection film 33 and the cathode 28 have the same height without any steps over the surface of the second protection film 33 to the surface of the gas diffusion layer 28a of the cathode 28 (see FIG. 2). The end surface 32a of the first protection film 32 may be aligned with the outer end surface 33a of the second protection film 33 at the same position.

For example, the first separator 14 and the second separator 16 are carbon separators. It should be noted that the first separator 14 and the second separator 16 may be metal plates elongated in the longitudinal direction such as steel plates, stainless steel plates, aluminum plates, plated steel sheets, or metal plates having anti-corrosive surfaces by surface treatment.

As shown in FIG. 1, the first separator 14 has an oxygen-containing gas flow field 34 on its surface 14a facing the membrane electrode assembly 12. The oxygen-containing gas flow field 34 is connected to the oxygen-containing gas supply passage 20a and the oxygen-containing gas discharge passage 20b. The oxygen-containing gas flow field 34 includes a plurality of flow grooves 34a extending in the direction indicated by the arrow C. An inlet buffer 36a is provided adjacent to the inlet of the oxygen-containing gas flow field 34, and an outlet buffer 36b is provided adjacent to the outlet of the oxygen-containing gas flow field 34.

A plurality of inlet connection channels 38a are formed between the inlet buffer 36a and the oxygen-containing gas supply passage 20a. Likewise, a plurality of outlet connection channels 38b are formed between the outlet buffer 36b and the oxygen-containing gas discharge passage 20b.

Figure 4:
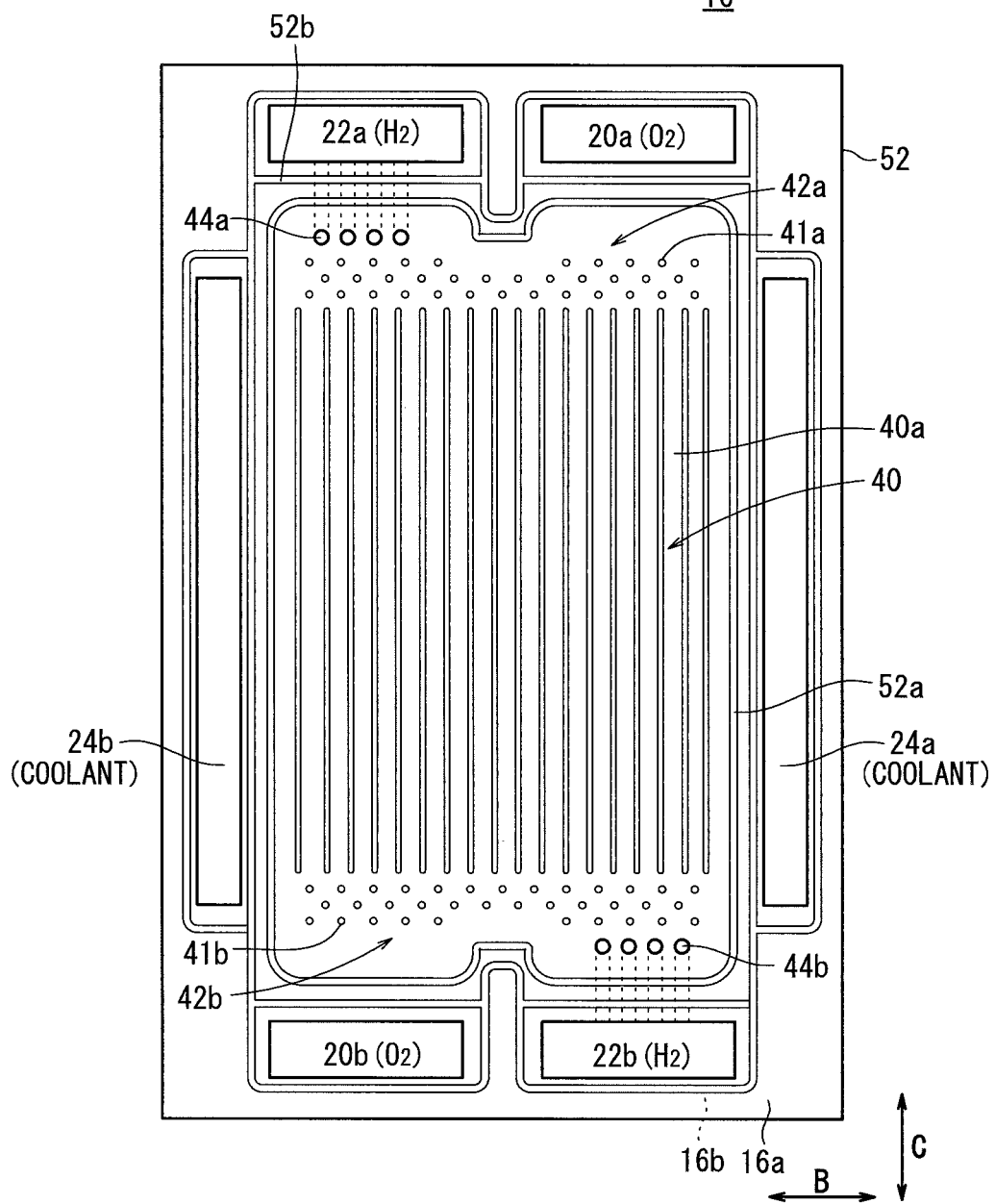
FIG. 4 is a front view showing a second separator of the fuel cell.

As shown in FIG. 4, the second separator 16 has a fuel gas flow field 40 on its surface 16a facing the membrane electrode assembly 12. The fuel gas flow field 40 is connected to the fuel gas supply passage 22a and the fuel gas discharge passage 22b. The fuel gas flow field 40 includes a plurality of flow grooves 40a extending in the direction indicated by the arrow C. An inlet buffer 42a is provided adjacent to the inlet of the fuel gas flow field 40, and an outlet buffer 42b is provided adjacent to the outlet of the fuel gas flow field 40. A plurality of bosses 41a, 41b are formed in the inlet buffer 42a and the outlet buffer 42b, respectively.

The second separator 16 has a plurality of supply holes 44a connecting the fuel gas supply passage 22a and the fuel gas flow field 40, and a plurality of discharge holes 44b connecting the fuel gas discharge passage 22b and the fuel gas flow field 40.

A coolant flow field 46 is formed between a surface 14b of the first separator 14 and a surface 16b of the second separator 16. The coolant flow field 46 is connected to the coolant supply passage 24a and the coolant discharge passage 24b. The coolant flow field 46 includes a plurality of flow grooves 46a extending in the direction indicated by the arrow B. An inlet buffer 48a is provided adjacent to the inlet of the coolant flow field 46, and an outlet buffer 48b is provided adjacent to the outlet of the coolant flow field 46. A plurality of bosses are formed in the inlet buffer 48a and the outlet buffer 48b, respectively.

As shown in FIGS. 1 and 2, a first seal member 50 is formed integrally with the surfaces 14a, 14b of the first separator 14, around the outer end of the first separator 14. Alternatively, a member separate from the first separator 14 may be provided as the first seal member 50 on the surfaces 14a, 14b of the first separator 14. A second seal member 52 is formed integrally with the surfaces 16a, 16b of the second separator 16, around the outer end of the second separator 16. Alternatively, a member separate from the second separator 16 may be provided as the second seal member 52 on the surfaces 16a, 16b of the second separator 16.

The first seal member 50 includes a ridge 50a. The ridge 50a is formed around the outer end of the membrane electrode assembly 12, while allowing the oxygen-containing gas flow field 34 to be connected to the oxygen-containing gas supply passage 20a and the oxygen-containing gas discharge passage 20b.

As shown in FIGS. 2 and 4, the second seal member 52 includes an inner seal (inner seal member) 52a which contacts the solid polymer electrolyte membrane 26 of the membrane electrode assembly 12 along the outer marginal surface 26a of the solid polymer electrolyte membrane 26, and an outer seal (outer seal member) 52b provided around the membrane electrode assembly 12 between the first separator 14 and the second separator 16.

In the fuel cell 10, a method of producing the membrane electrode assembly 12 will be described with reference to FIG. 5.

Figure 5:
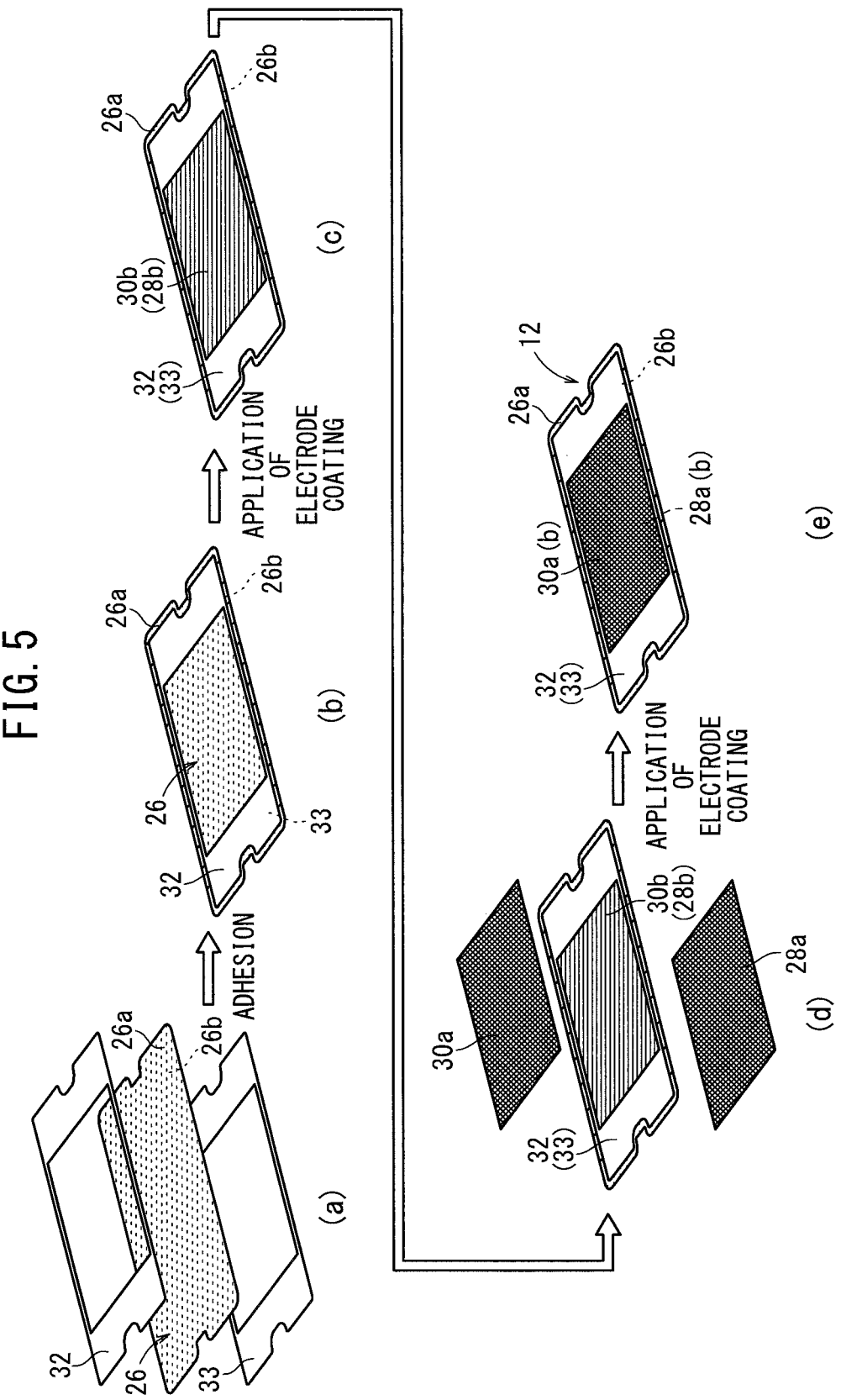
FIG. 5 is a view illustrating a method of producing the membrane electrode assembly.

Firstly, as shown in (a) of FIG. 5, the frame shaped first protection film 32 and the frame shaped second protection film 33 are provided on both surfaces of the solid polymer electrolyte membrane 26. The first protection film 32 is joined to one outer marginal surface 26a of the solid polymer electrolyte membrane 26, e.g., using acrylic based (or fluorine based) adhesive. The second protection film 33 is joined to the other marginal surface 26b of the solid polymer electrolyte membrane 26, e.g., using acrylic based (or fluorine based) adhesive (see (b) of FIG. 5).

Then, as shown in (c) of FIG. 5, the electrode catalyst layers 30b, 28b are formed on both surfaces of the solid polymer electrolyte membrane 26 by applying coating of catalyst paste at an opening of the film. Specifically, for example, ion conductive component and catalyst particles which consist of carbon particles supporting Pt are mixed at certain proportions to make catalyst paste. Then, screen printing is applied to both surfaces of the solid polymer electrolyte membrane 26 using this catalyst paste. Then, the catalyst paste is dried to form the electrode catalyst layers 30b, 28b.

Then, the process proceeds to the step in (d) of FIG. 5, and the gas diffusion layers 30a, 28a are joined to the electrode catalyst layers 30b, 28b. Specifically, the gas diffusion layers 30a, 28a and the electrode catalyst layers 30b, 28b are combined together by hot pressing. The acrylic adhesive may be applied to the outer marginal portions of the gas diffusion layers 30a, 28a to join the gas diffusion layers 30a, 28a to the electrode catalyst layers 30b, 28b. In this manner, the membrane electrode assembly 12 is produced (see (e) of FIG. 5).

Then, operation of the fuel cell 10 will be described below.

As shown in FIG. 1, an oxygen-containing gas is supplied to the oxygen-containing gas supply passage 20a, and a fuel gas such as a hydrogen containing gas is supplied to the fuel gas supply passage 22a. Further, a coolant such as pure water, ethylene glycol, or oil is supplied to the coolant supply passage 24a.

In the structure, the oxygen-containing gas from the oxygen-containing gas supply passage 20a is supplied through the inlet connection channels 38a into the oxygen-containing gas flow field 34. The oxygen-containing gas flows along the oxygen-containing gas flow field 34 in the direction of gravity indicated by the arrow C, and the oxygen-containing gas is supplied to the cathode 28 of the membrane electrode assembly 12.

In the meanwhile, the fuel gas from the fuel gas supply passage 22a flows through the supply holes 44a toward the surface 16a of the second separator 16. As shown in FIG. 4, the fuel gas flows along the fuel gas flow field 40 in the direction of gravity indicated by the arrow C, and the fuel gas is supplied to the anode 30 of the membrane electrode assembly 12 (see FIG. 1).

Thus, in the membrane electrode assembly 12, the oxygen-containing gas supplied to the cathode 28 and the fuel gas supplied to the anode 30 are partially consumed in the electrochemical reactions at electrode catalyst layers of the cathode 28 and the anode 30 for generating electricity.

Then, the oxygen-containing gas supplied and partially consumed at the cathode 28 of the membrane electrode assembly 12 is discharged along the oxygen-containing gas discharge passage 20b in the direction indicated by the arrow A. The fuel gas supplied to the anode 30 of the membrane electrode assembly 12 and partially consumed flows through the discharge holes 44b toward the surface 16b of the second separator 16. After the fuel gas reaches the surface 16b, the fuel gas is discharged into the fuel gas discharge passage 22b.

Further, as shown in FIG. 1, the coolant supplied to the coolant supply passage 24a flows into the coolant flow field 46. The coolant flowing from the coolant supply passage 24a through the coolant flow field 46 moves in the direction indicated by the arrow B to cool the fuel cell 10, and then, the coolant is discharged into the coolant discharge passage 24b.

In the first embodiment, as shown in FIG. 2, in the membrane electrode assembly 12, the end of the solid polymer electrolyte membrane 26 protrudes outward beyond the ends of the gas diffusion layers 30a, 28a. The first protection film 32 and the second protection film 33 are joined to the outer marginal surfaces 26a, 26b as both surfaces at the end of the solid polymer electrolyte membrane 26.

In the structure, the outer marginal surfaces 26a, 26b of the solid polymer electrolyte membrane 26 sandwiched between the first protection film 32 and the second protection film 33 are protected reliably. The outer end surface 33a of the second protection film 33 and the outer end surface of the solid polymer electrolyte membrane 26 extend to the same position. Thus, the solid polymer electrolyte membrane 26 is reinforced further reliably.

Further, the thickness T1 of the first protection film 32 is smaller than the thickness T2 of the second protection film 33. It is because, since the second protection film 33 has the reinforcement function for the solid polymer electrolyte membrane 26, the thickness of the first protection film 32 can be minimized.

Thus, it is possible to ensure that the sufficient flow field height is achieved in each of the inlet buffer 42a and the outlet buffer 42b, and the fuel gas flow field 40 on the side where the first protection film 32 is provided. Further, the fuel gas can be supplied to the power generation area in the fuel gas flow field 40 almost at the uniform flow rate, and improvement in the power generation performance is achieved. Thus, the desired power generation performance is maintained, and the overall thickness of the fuel cell 10 is reduced easily.

Depending on the layout, for example, in the structure where reactant gas flow fields (fuel gas flow field and oxygen-containing gas flow field) are provided on both sides of the separator (structure where the coolant flow field is provided in a skipped manner), the flow field on the side where the second protection film is provided, adjacent to the first protection film through the separator, is expanded toward the first protection film to achieve the desired reactant flow field height (depth) on the side where the second protection film is provided.

Further, the gas diffusion layers 30a, 28a are provided only in the power generation area, and the first protection film 32 and the second protection film 33 are provided in the inlet buffers 42a, 36a, the gas inlets, and the gas outlets, where no gas diffusion function is required. Therefore, the amount of relatively expensive material such as carbon papers or carbon clothes used in the fuel cell 10 is significantly reduced, and the production cost of the fuel cell 10 is reduced suitably.

Further, since the gas diffusion layers 30a, 28a have a rectangular shape, for example, after coating of a base layer is applied to the entire carbon paper having a roll shape continuously, by cutting it into pieces each having a plurality of length, the gas diffusion layers 30a, 28a can be produced easily. Thus, improvement in the productivity of the gas diffusion layer 30a, 28a is achieved. Further, the shape of the gas diffusion layers 30a, 28a is simplified, and yield rate of the material is improved suitably and economically.

Figure 6:
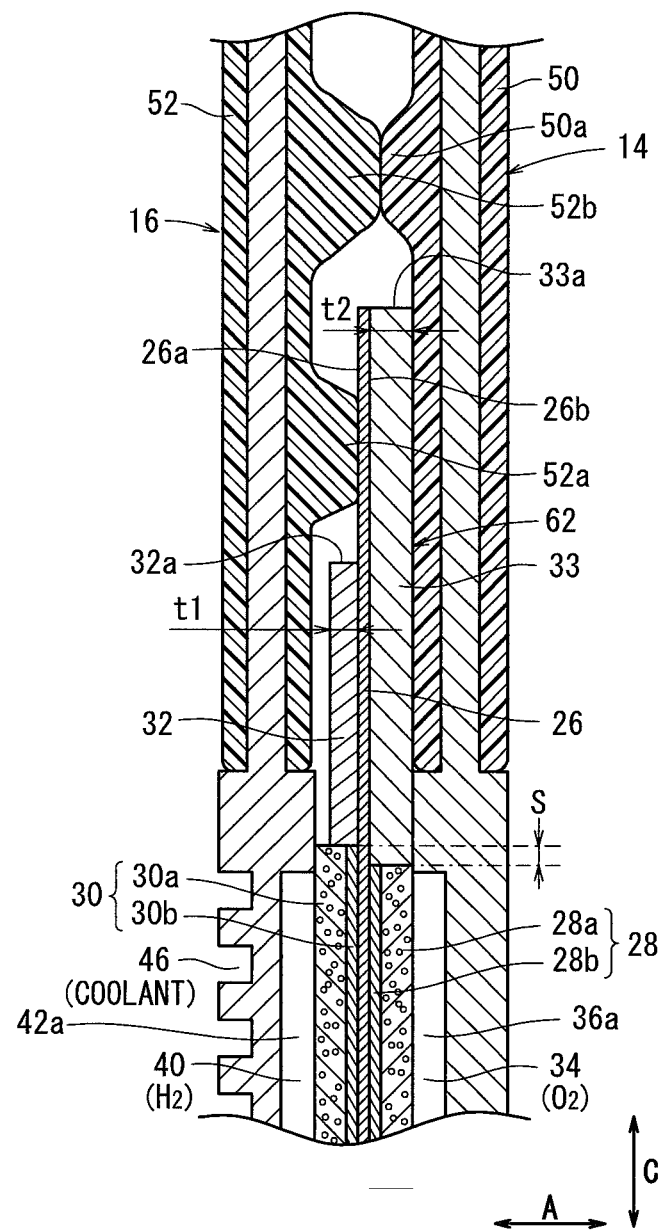
FIG. 6 is a cross sectional view showing a fuel cell according to a second embodiment of the present invention.
Figure 7:
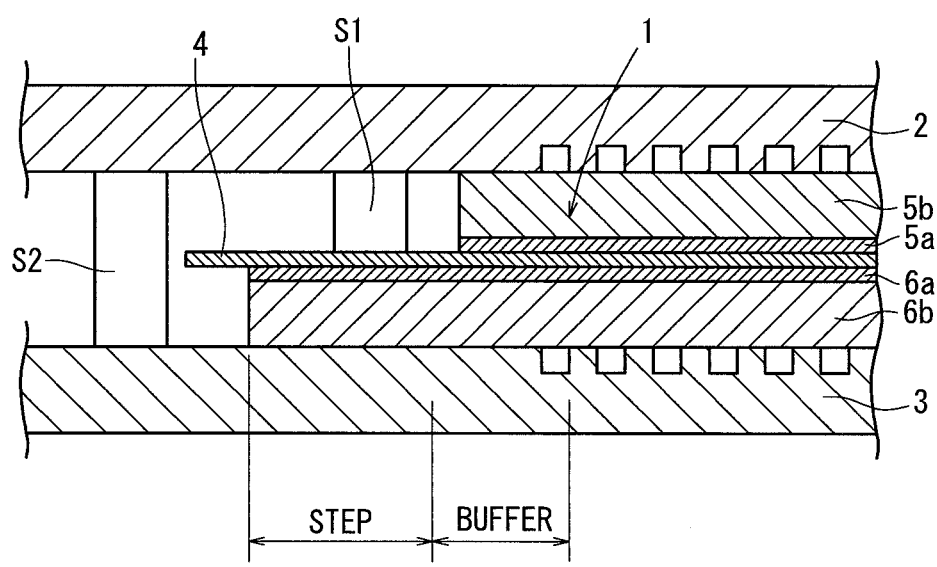
FIG. 7 is a cross sectional view showing a fuel cell disclosed in Japanese Laid-Open Patent Publication No. 2006-318940.

FIG. 6 is a cross sectional view showing a fuel cell 60 according to a second embodiment of the present invention. The constituent elements that are identical to those of the fuel cell 10 according to the first embodiment are labeled with the same reference numerals, and description thereof is omitted.

The fuel cell 60 includes a membrane electrode assembly 62. An end surface of the anode 30 of the membrane electrode assembly 62 protrudes outward beyond the end surface of the cathode 28 by a distance S.

Thus, in the second embodiment, the end surface of the anode 30 and the end surface of the cathode 28 on both sides of the solid polymer electrolyte membrane 26 are shifted from each other in the stacking direction indicated by the arrow A. In the structure, in particular, it becomes possible to reliably suppress shear stress concentration in the solid polymer electrolyte membrane 26.

Instead of adopting the above structure, the end surface of the cathode 28 may protrude outward beyond the end surface of the anode 30 by the distance S.

The invention claimed is:

1. A fuel cell formed by stacking a membrane electrode assembly and separators, the membrane electrode assembly including an electrolyte membrane and a pair of gas diffusion layers provided on both sides of the electrolyte membrane, wherein, in the membrane electrode assembly, an end of the electrolyte membrane protrudes outward beyond ends of the gas diffusion layers; and both surfaces at the end of the electrolyte membrane are sandwiched between a first protection film and a second protection film, and the thickness of the first protection film is smaller than the thickness of the second protection film, wherein the second protection film is joined along an entire length of the protruded electrolyte membrane, wherein an outer end of the first protection film is positioned inside an outer end of the electrolyte membrane, and wherein one of the outer marginal surfaces of the electrolyte membrane is exposed, the fuel cell further including an inner seal member provided between the one of the outer marginal surfaces of the electrolyte membrane exposed outside the first protection film and one of the separators.

2. The fuel cell according to claim 1, further comprising an outer seal member provided around the membrane electrode assembly, between a pair of the separators.

3. The fuel cell according to claim 1, wherein the first protection film faces a buffer provided in the separator.

4. The fuel cell according to claim 1, wherein end surfaces of the pair of gas diffusion layers on both sides of the electrolyte membrane are shifted from each other in a stacking direction.

* * * * *